United States Patent [19]

Hayashi et al.

[11] Patent Number: 4,766,982
[45] Date of Patent: Aug. 30, 1988

[54] APPARATUS FOR SUPPORTING AND DRIVING WHEEL ANGULAR DECELERATION SENSOR

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 737,383

[22] Filed: May 23, 1985

[30] Foreign Application Priority Data

May 26, 1984 [JP] Japan .................. 59-106918

[51] Int. Cl.⁴ .............................. B60T 8/34
[52] U.S. Cl. .............................. 188/181 A; 180/219; 188/272; 280/276; 280/703; 303/115
[58] Field of Search ............... 180/219, 218; 280/276, 280/703, 279; 188/272, 2 A; 464/23, 52, 57, 58, 162, 172, 173, 183; 188/181 A, 181 R; 303/112, 115, 24 R

[56] References Cited

U.S. PATENT DOCUMENTS

| | | | |
|---|---|---|---|
| Re. 31,387 | 9/1983 | Bayliss | 303/115 |
| 2,329,249 | 9/1943 | Carlson | 280/276 |
| 2,818,244 | 12/1957 | Ropar | 264/1 |
| 2,920,924 | 1/1960 | Reswick et al. | 303/24 |
| 2,954,237 | 9/1960 | Sampietro | 280/703 |
| 3,046,060 | 7/1962 | Stager et al. | 303/21 |
| 3,403,761 | 10/1968 | Rockwell | 188/265 |
| 3,537,715 | 11/1970 | Gualdoni | 280/703 |
| 3,556,613 | 1/1971 | Keller | 188/181 R |
| 3,655,016 | 4/1972 | Watanabe | 188/2 A |
| 3,667,816 | 6/1972 | Harned | 303/21 |
| 3,731,767 | 5/1973 | Lefort | 188/72.2 |
| 3,829,166 | 8/1974 | von Loewis et al. | 303/21 CG |
| 3,989,261 | 11/1976 | Kawaguchi | 280/276 |
| 4,036,331 | 7/1977 | Hayashi et al. | 188/187 |
| 4,046,427 | 9/1977 | Baynes et al. | 303/115 |
| 4,050,748 | 9/1977 | Belart | 303/114 |
| 4,114,460 | 9/1978 | Oto | 280/276 |
| 4,159,123 | 6/1979 | Petty | 188/272 |
| 4,239,294 | 12/1980 | Burgdorf | 188/344 |
| 4,260,170 | 4/1981 | Terai | 280/276 |
| 4,260,201 | 4/1981 | Farr | 303/99 |
| 4,274,518 | 6/1981 | Berisch | 188/344 |
| 4,281,881 | 8/1981 | Mekosh et al. | 303/99 |
| 4,289,359 | 9/1981 | Lüpertz et al. | 188/344 |
| 4,340,258 | 7/1982 | Farr | 303/115 |
| 4,350,396 | 9/1982 | Mortimer | 303/115 |
| 4,353,440 | 10/1982 | Farr | 188/181 A |

(List continued on next page.)

FOREIGN PATENT DOCUMENTS

| | | | |
|---|---|---|---|
| 0495146 | 8/1953 | Canada | 188/2 R |
| 17446 | 12/1955 | Fed. Rep. of Germany | 280/276 |
| 14295 | 4/1980 | Japan . | |
| 45421 | 11/1980 | Japan . | |
| 120440 | 1/1981 | Japan | 280/703 |
| 33052 | 2/1982 | Japan . | |
| 676708 | 7/1952 | United Kingdom . | |
| 778765 | 7/1957 | United Kingdom . | |
| 894577 | 4/1962 | United Kingdom . | |
| 895294 | 5/1962 | United Kingdom . | |
| 2069641 | 8/1981 | United Kingdom . | |
| 2069642 | 8/1981 | United Kingdom | 188/181 A |
| 2109494 | 6/1983 | United Kingdom . | |

OTHER PUBLICATIONS

SAE Technical Series 830484, pp. 1-8, "Performance of Antilock Brakes with Simplified Control Technique", by Makoto Satoh & Shuji Shiraishi, 1983.
SAE Section 5: Technical Sessions, pp. 903-909, "Performance of a Simplified Control Technique for Antilock Brakes," by Makoto Satoh & Shuji Shiraishi, 1983.

Primary Examiner—John J. Love
Assistant Examiner—Everett G. Diederiks, Jr.
Attorney, Agent, or Firm—Lyon & Lyon

[57] ABSTRACT

In a vehicle having a wheel suspended on a body through a suspension device with a damping facility, a sensor having a flywheel and detecting a wheel angular deceleration is supported on the stationary supporting structure of the suspension device which consists of a vehicle body side member and a vehicle body, and a transmission device for connection between the wheel and a drive shaft leading to the sensor is so constructed as to absorb the vertical vibration transmitted from the wheel.

7 Claims, 7 Drawing Sheets

U.S. PATENT DOCUMENTS

| | | |
|---|---|---|
| 4,354,715 | 10/1982 | Farr et al. .......................... 303/116 |
| 4,355,849 | 10/1982 | Wilson ............................... 303/116 |
| 4,365,538 | 12/1982 | Andoh ..................................... 91/1 |
| 4,377,221 | 3/1983 | Farr ................................ 188/181 A |
| 4,381,049 | 4/1983 | Crossman ......................... 188/72.7 |
| 4,381,125 | 4/1983 | Wilson ............................... 303/116 |
| 4,387,934 | 6/1983 | Farr .................................... 303/116 |
| 4,401,348 | 8/1983 | Farr .................................... 303/116 |
| 4,405,006 | 9/1983 | Preusker ........................... 152/170 |
| 4,405,181 | 9/1983 | Resch et al. ........................ 303/9 |
| 4,408,673 | 10/1983 | Leiber ............................... 180/141 |
| 4,414,630 | 11/1983 | Harris et al. ..................... 364/426 |
| 4,416,353 | 11/1983 | Ivanov ............................. 188/2 A |
| 4,421,359 | 12/1983 | Hayashi et al. ................... 303/6 A |
| 4,422,695 | 12/1983 | Farr ................................... 303/115 |
| 4,428,624 | 1/1984 | Farr ................................... 303/116 |
| 4,437,678 | 3/1984 | Schultz ............................. 280/276 |
| 4,456,309 | 6/1984 | Rath .................................... 303/10 |
| 4,456,310 | 6/1984 | Hayashi et al. ................... 303/119 |
| 4,457,563 | 7/1984 | Farr ..................................... 303/92 |
| 4,465,322 | 8/1984 | Hayashi ............................ 303/6 A |
| 4,474,413 | 10/1984 | Farr ................................... 303/116 |
| 4,475,774 | 10/1984 | Davis ................................ 303/112 |
| 4,494,800 | 1/1985 | Hayashi ............................ 303/6 A |
| 4,515,384 | 5/1985 | Honma et al. ................... 280/276 |
| 4,552,373 | 11/1985 | Kawaguchi et al. ............. 280/276 |
| 4,564,244 | 1/1986 | Reinartz et al. ................... 303/6 C |
| 4,572,317 | 2/1986 | Isono ................................ 280/703 |
| 4,602,705 | 7/1986 | Farr .............................. 188/181 A |

APPARATUS FOR SUPPORTING AND DRIVING WHEEL ANGULAR DECELERATION SENSOR

BACKGROUND OF THE INVENTION

1. Field of the Invention

This invention relates to an apparatus for supporting and driving a wheel angular deceleration sensor applied to an antilock control device or the like for motorcycles and automobiles for the purpose of detecting a wheel angular deceleration of more than a predetermined value, and more particularly to an apparatus for supporting and driving an inertia type sensor having a flywheel driven by a wheel.

2. Description of the Prior Art

A conventional wheel angular deceleration sensor of such kind is, as is disclosed, for example, in Japanese Patent Laid-Open No. 120440/1981, supported by a wheel side member of a suspension device for connecting a car body and a wheel, and the drive shaft of the sensor is driven by the wheel through a transmission device.

In such conventional device, however, the wheel angular deceleration sensor is subject to the vertical vibration of the wheel while a vehicle is running, particularly when on a bad road, and therefore involves a risk of being influenced by the vibration. Further, since the sensor has a considerably heavy flywheel built-in, the spring load of the suspension device is disadvantageously increased.

SUMMARY OF THE INVENTION

Accordingly it is an object of the invention to provide an apparatus for supporting and driving a wheel angular deceleration sensor in which the above-described problems are solved.

To achieve this object, the invention provides an apparatus for supporting and driving a wheel angular deceleration sensor for a vehicle, comprising: a vehicle body side member which constitutes a stationary supporting structure of a suspension device together with a vehicle body; and a wheel side member which is movable in accordance with the vertical vibration of the wheel and which constitutes a followingly movable structure of the suspension device together with the wheel; wherein the stationary supporting structure supports an inertia type wheel angular deceleration sensor having a flywheel and wherein a transmission device connecting a drive shaft leading to the sensor with the wheel is so constituted as to absorb the vertical vibration transmitted from the wheel.

According to this structure, since the vertical vibration of a wheel is absorbed by a wheel side member of a suspension device during running of a vehicle, transmission of the vibration to a wheel angular deceleration sensor supported by a vehicle side member is restrained. As a result, more reliable operation of the sensor is attained, since it is protected from any influence from the vibration. Since the sensor is excluded from the spring load of the suspension device, the load of the suspension device is reduced by that degree, thereby improving the followability of the wheel to the road surface.

Furthermore, since the transmission device is so composed as to absorb the vertical vibration of the wheel likewise the suspension device, it can continuously transmit rotation of the wheel to the drive shaft of sensor irrespective of the vertical vibration of the wheel.

If constituents of the antilock control unit other than the sensor and a master cylinder which produces braking oil pressure are supported on the stationary supporting structure, the arrangement and hence mounting of the hydraulic conduits related to those constituents and cylinder are facilitated.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1 to 6 show a first embodiment of this invention, wherein

FIG. 1 is a side elevational view of the front portion of a motorcycle;

FIG. 2 is a front view in vertical section of the main part of FIG. 1;

FIG. 3 is a sectional view taken along the line III—III in FIG. 3;

FIG. 4 is a vertical elevational view of the antilock control unit shown in FIG. 2;

FIGS. 5 and 6 are sectional views taken along the lines V—V and VI—VI, respectively of FIG. 4;

DESCRIPTION OF THE PREFERRED EMBODIMENTS

Figure 1:
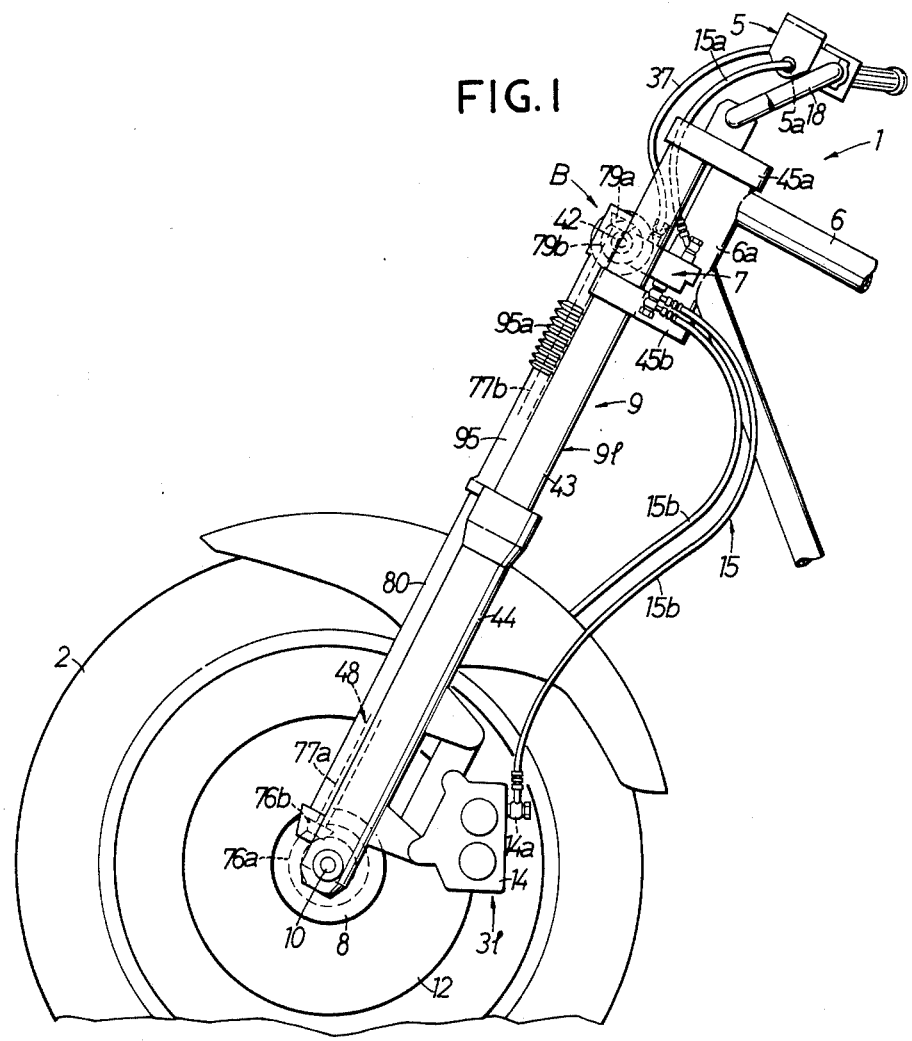
Figure 2:
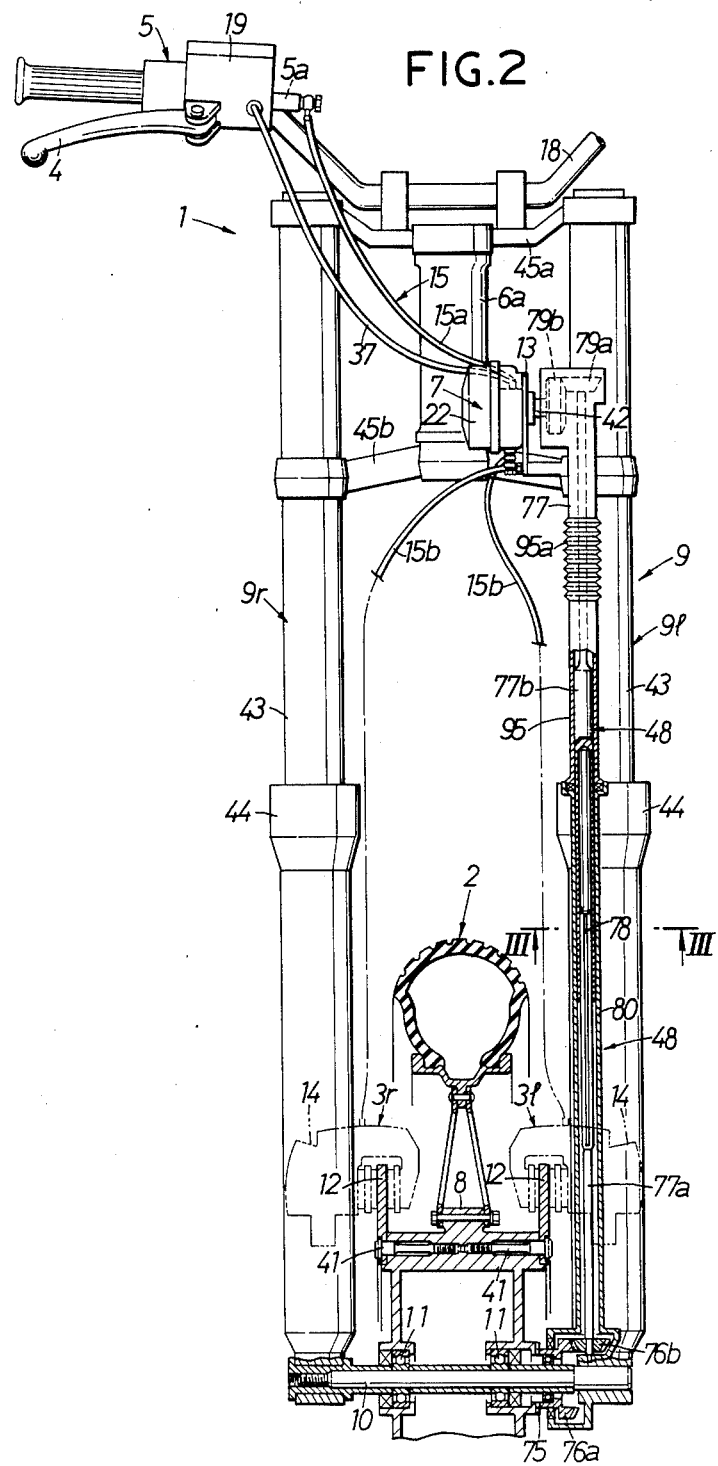

Hereunder the embodiments of this invention will be explained with reference to the accompanying drawings. Referring first to FIGS. 1 and 2 showing a first embodiment, a front wheel 2 is suspended on a head pipe 6a formed on the front end of the vehicle body 6 of a motorcycle 1 through a front fork 9 which acts as a suspension device.

The front fork 9 is composed of a pair of left and right fork legs 9l and 9r, each of which is telescopically composed of a fork pipe 43 on the upper side and a bottom case 44 on the lower side. A suspension spring and a damping mechanism are incorporated in each leg. The right and left fork pipes 43, 43 are steerably connected to the head pipe 6a through a vertical pair of bridge members 45a, 45b which integrally connect the fork pipes 43, 43 together. Both ends of an axle 10 rotatably supporting the front wheel 2 are secured to the lower ends of the right and left bottom cases 44, 44.

The fork pipes 43, 43 and the bridge members 45a, 45b constitute as vehicle body side members of the suspension device a stationary supporting structure of the invention together with the vehicle body 6.

The bottom cases 44, 44, together with the wheel 2, constitute as wheel side members of the suspension device a followingly movable structure.

A front wheel braking device of the motorcycle 1 includes front wheel brakes 3l, 3r provided on both sides of the front wheel 2, a master cylinder 5 attached to a steering handle 18 and operable by a brake lever 4, and an antilock control unit 7 attached to a wheel side member of the vehicle body 6 or the front fork 9, such as the lower bridge member 45b through a bracket 13. A wheel angular deceleration sensor 21 according to the invention is provided within the antilock control unit 7.

Each of the front-wheel brakes 3l and 3r is composed of a brake disk 12 secured to the end surface of a hub 8 of the front wheel 2 by bolts 41, and a brake caliper 14 supported by the corresponding bottom case 44 so as to straddle over the brake disk 12. The brake caliper 14 is hydraulically actuated to apply braking force to the front wheel by clamping the brake disk 12 under pressure.

A hydraulic conduit 15 extending from an output port 5a of the master cylinder 5 is connected to an input port 14a of each brake caliper 14, and the antilock control unit 7 for controlling the output oil pressure of the master cylinder 5 is disposed midway of the hydraulic conduit 15.

A drive shaft 42 of the antilock control unit 7 protrudes toward the fork leg 9l from a casing 22 and is connected to the hub 8 of the front wheel 2 through a telescopically constructed transmission device 48.

The transmission device 48 is composed of a lower drive bevel gear 76a which is connected to the end surface of the hub 8 through a dog coupling 75, a lower driven bevel gear 76b which meshes with the bevel gear 76a, a lower rotary shaft 77a having a lower end connected to the bevel gear 76b, an upper rotary shaft 77b which is axially slidably fitted over the outer periphery of the lower rotary shaft 77a through a spline 78, an upper drive bevel gear 79a which is connected to the upper end of the upper rotary shaft 77b, and an upper driven bevel gear 79b which meshes with this bevel gear 79a and is secured to the drive shaft 42. Each of the gear ratios of 76a:76b and 79a:79b is so determined as to make the rotational speed of the drive shaft 42 higher than that of the hub 8.

The bevel gears 76a, 76b and the lower rotary shaft 77a are housed in a transmission housing 80 provided continuously on one side of the bottom case 44 of one fork leg 9l, and this transmission housing 80 rotatably and slidably supports the lower end portion of the upper rotary shaft 77b.

Figure 3:
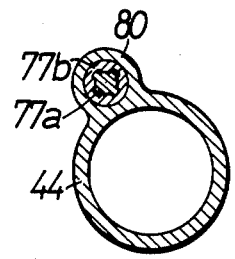
Figure 3A:
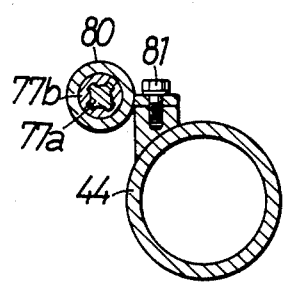
FIG. 3A is a sectional view of a modified form of the main part shown in FIG. 2 similar to FIG. 3.

The transmission housing 80 is integrally moulded with the bottom case 44, as is shown in FIG. 3, or is, after being formed separately, secured to the bottom case 44 by a bolt 81 as is shown in FIG. 3A.

The portion of the upper rotary shaft 77b protruding from the transmission housing 80 and the upper drive and driven bevel gears 79a and 79b are enveloped by a cover 95, the middle portion of the cover 95 being formed as a flexible bellows to be expandable and contractable in correspondence with the telescopic movement of the fork leg 9l.

Figure 4:
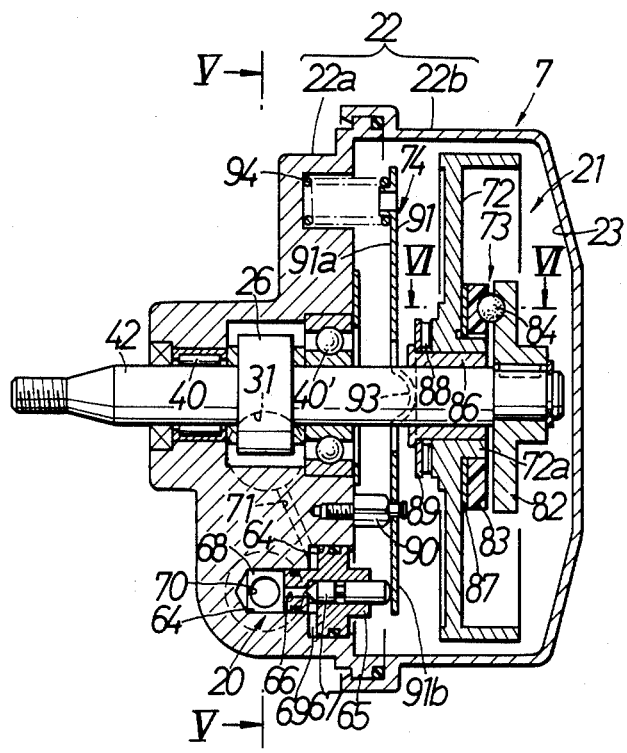
Figure 5:
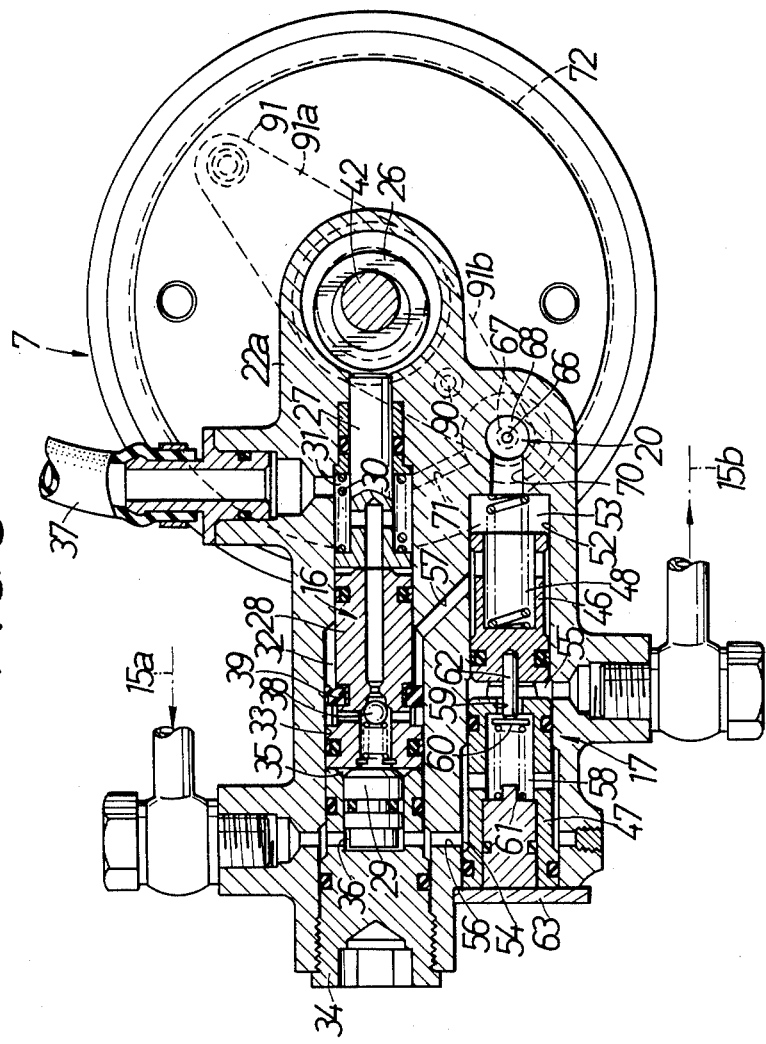

As illustrated in FIG. 4 and FIG. 5, the antilock control unit 7 has a casing 22 constituted of a casing body 22a bearing the drive shaft 42 rotatably through bearings 40, 40', and a cup-like cover 22b fitted in one end of the casing body 22a and defining a sensor chamber 23 therewith. A hydraulic pump 16, a modulator 17, an exhaust pressure valve 20 and an inertia type wheel angular deceleration sensor 21 are housed in the casing 22.

The hydraulic pump 16 is constituted of an eccentric cam 26 formed on the drive shaft 42 between both the bearings 40, 40', a push rod 27 disposed with its inner end opposed to the eccentric cam 26, a pump piston 28 in contact with an outer end of the push rod 27, an actuating piston 29 in contact with an outer end of the pump piston 28, and a return, spring 30 biassing a push rod 27 in the direction away from the eccentric cam 26.

The push rod 27 and the pump piston 28 are slidably fitted in a first cylinder hole 33 formed on the casing body 22a to define an inlet chamber 31 and an outlet chamber 32 around their outer peripheries respectively. Further, a plug 34 is fitted to an outer end portion of the first cylinder hole 33 so as to form a pump chamber 35 together with the pump piston 28, and the actuating piston 29 is slidably fitted in the plug 34 so as to form a hydraulic chamber 36.

The inlet chamber 31 is kept communicating with an oil tank 19 through a conduit 37 and also with the pump chamber 35 through a suction valve 38, and the pump chamber 35 is kept communicating with the outlet chamber 32 through a unidirectional sealing member 39 functioning as a discharge valve. Then, the hydraulic chamber 36 is connected to an upstream pipe 15a of the hydraulic conduit 15 so as to communicate at all times with the output port 5a of the master cylinder 5.

The modulator 17 is constituted of a pressure reducing piston 46, a fixed piston 47 engageable with one end of the pressure reducing piston 46 to regulate the retraction limit of the latter, and a return spring 48 for biassing the piston 46 in the direction to contact the fixed piston 47, and both the pistons 46, 47 are slidingly fitted in a second cylinder hole 52 formed on the casing body 22a adjacently the first cylinder hole 33.

In the second cylinder hole 52, the pressure reducing piston 46 defines a hydraulic control chamber 53 together with an inner end wall of the second cylinder hole 52 and also defines an output hydraulic chamber 55 against the fixed piston 47, and the fixed piston 47 defines an input hydraulic chamber 54 around its outer periphery. The input hydraulic chamber 54 is kept communicating with the hydraulic chamber 36 of the hydraulic pump 16 through an oil passage 56, the output hydraulic chamber 55 is connected to downstream pipes 15b of the hydraulic conduit 15 so as to communicate at all times with each of the input ports 14a of the front wheel brakes 3l, 3r and the hydraulic control chamber 53 is kept communicating with the outlet chamber 32 of the hydraulic pump 16 through an oil passage 57.

The fixed piston 47 is provided with a valve chamber 58 communicating at all times with the input hydraulic chamber 54, and a valve port 59 for keeping the valve chamber 58 in communication with the output hydraulic chamber 55. A valve body 60 for opening and closing the valve port 59 and a valve spring 61 for pressing the valve body 60 to the closing side are enclosed in the valve chamber 58. Further, a valve opening rod 62 for moving the valve body 60 to an open position is provided projectingly on one end surface of the pressure reducing piston 46, and the valve opening rod 62 keeps the valve body 60 open when the pressure reducing piston 46 is positioned at the retraction limit.

An outside opening of the second cylinder hole 52 is closed by an end plate 63 fixed to the casing body 22a, and the fixed piston 47 is kept at a position coming in contact with the end plate 63 at all times by the resilience of the return spring 48 or by the hydraulic pressure introduced into the input and output hydraulic chambers 54, 55.

The exhaust pressure valve 20 is constituted of a valve seat member 65 fitted in a stepped cylinder hole 64 of the casing body 22a, and a valve body 67 which slides in the valve seat member 65 for opening and closing a valve port 66. The valve seat member 65 defines an inlet chamber 68 at the small diameter end of the stepped cylinder hole 64 and an outlet chamber 69 at the large diameter end, the chambers 68, 69 communicating with each other through the valve port 66. Then, the inlet chamber 68 is kept communicating with the hydraulic control chamber 53 of the modulator 17 through an oil passage 70, and the outlet chamber 69 is kept communicating with the inlet chamber 31 of the hydraulic pump 16 through an oil passage 71. As a result, the outlet chamber 69 communicates with the oil tank 19.

The wheel angular deceleration sensor 21 comprises a flywheel 72 borne rotatably and slidably on the drive shaft 42 through a bearing bush 86, a cam mechanism 73 transmitting the rotational torque of the drive shaft 42 to the flywheel 72 and transforming an overrunning rotation of the flywheel 72 into an axial displacement thereof, and an output lever mechanism 74 capable of actuating the exhaust pressure valve 20 in response to the axial displacement of the flywheel 72.

The cam mechanism 73 is constituted of a drive cam plate 82 fixed to the drive shaft 42, a driven cam plate 83 disposed opposite to the drive cam plate 82 for relative rotation, and a thrust ball 84 engaging with cam recesses 82a, 83a formed on opposed surfaces of both the cam plates 82, 83.

Figure 6:
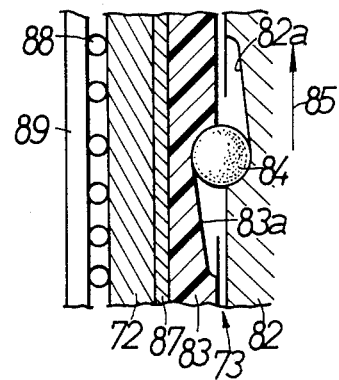

As shown in FIG. 6, the cam recess 82a of the drive cam plate 82 is inclined so that the bottom becomes increasingly shallower in a direction 85 of rotation of the drive shaft 42, and the cam recess 83a of the driven cam plate 83 is inclined so that the bottom becomes increasingly deeper toward the rotational direction 85. Accordingly, in a normal case the drive cam plate 82 assumes a driving side position in relation to the driven cam plate 83, the thrust ball 84 engages both the cam recesses 82a, 83a at their deepest portions, the torque received by the drive cam plate 82 from the drive shaft 42 is transmitted only to the driven cam plate 83, so that relative rotation is not caused between the cam plates 82, 83. However, if the position is reversed and the driven cam plate 83 overruns the drive cam plate 82, relative rotation is caused between the cam plates 82, 83, the thrust ball 84 rolls to climb the inclined bottoms of both the cam recesses 82a, 83a to impart thrust to both the cam plates 82, 83, and thus axial displacement is caused on the driven cam plate 83 in a direction moving away from the drive cam plate 82.

The driven cam plate 83 is borne rotatably on a boss 72a of the flywheel 72 and also engages one side of the flywheel 72 through a frictional clutch plate 87. A push plate 89 is provided additionally on the other side of the flywheel 72 through a thrust bearing 88.

The output lever mechanism 74 is provided with a bearing shaft 90 projecting from the casing body 22a at a position intermediately of the drive shaft 42 and the exhaust pressure valve 20, and a lever 91 supported axially swingably on a nose portion of the bearing shaft 90. The lever 91 is constituted of a long first arm 91a extending from the bearing shaft 90 while surrounding the drive shaft 42, and a short second arm 91b extending from the bearing shaft 90 toward the exhaust pressure valve 20, and an abutment portion 93 coming into contact with an outside surface of the push plate 89 is formed bulgingly at an intermediate portion of the first arm 91a.

A spring 94 is provided between the tip end of the first arm 91a and the casing body 22a, and the tip end of the second arm 91b comes in contact with an outer end of the valve body 67 of the exhaust pressure valve 20.

The resilient force of the spring 94 works on the lever 91 to press the abutment portion 93 of the first arm 91a to the push plate 89 and also normally press the valve body 67 of the exhaust pressure valve 20 to keep it in open state. Then, the force received by the push plate 89 from the spring 94 imparts a constant frictional engaging force to the flywheel 72, the frictional clutch plate 87 and the driven cam plate 83 and also imparts an access force to both the cam plates 82, 83.

Further, the above frictional engaging force is set so that the frictional clutch plate 87 slides when a rotational torque on or above a given value is generated between the driven cam plate 83 and the flywheel 72.

An operation of the embodiment will be described next.

While a vehicle is travelling, the drive shaft 42 is acceleratedly driven by the rotating front wheel 2 through the transmission device 48, then the flywheel 72 is driven through the cam mechanism 73 and the frictional clutch plate 87 so that the flywheel 72 rotates faster than the front wheel 2. Accordingly, a large rotational force of inertia is given to the flywheel 72.

Then, the eccentric cam 26 of the hydraulic pump 16 is rotated through the drive shaft 42 simultaneously with the rotation of flywheel 72.

During vehicle travelling with the shaft 42 being driven acceleratingly, if the front wheel 2 moves up and down in an oscillating manner so as to follow a rough road surface, the upper and lower rotary shafts 77a and 77b of the transmission device 48 perform a relative sliding movement at their spline-fitted portion in response to the telescopic movement of front fork 9. Thus, in spite of the vertical oscillation of the front wheel 2, rotation of the wheel 2 can be transmitted to the drive shaft 42 without fail. Furthermore, since the vertical oscillation of the front wheel 2 can be absorbed by the telescopic or expanding movement of the front fork 9, more specifically, by sliding movements of the bottom case 44, as a wheel side member, relative to the upper fork pipe 43, as a vehicle body side member, through the medium of the suspension spring and the damping mechanism, it is ensured that such vibration can be prevented from being transmitted to the antilock control unit 7 as supported on a vehicle body side member upwardly of the front fork 9, that is, on the lower bridge member 45b. In addition, the antilock control unit 7 can be excluded from the spring load of the front fork 9.

When the master cylinder 5 is actuated for braking the front wheel 2, its output hydraulic pressure is supplied to the front wheel brakes 3l, 3r by way of the upstream pipe 15a of the hydraulic conduit 15, the hydraulic chamber 36 of the hydraulic pump 16, the input hydraulic chamber 54 of the modulator 17, the valve chamber 58, the valve port 59, the output hydraulic chamber 55 and the downstream pipes 15b of the hydraulic conduit 15 in that order, and the brakes 3l, 3r are actuated accordingly to apply brake force to the front wheel 2.

On the other hand, since the output hydraulic pressure of the master cylinder 5 is introduced into the hydraulic chamber 36 in the hydraulic pump 16, a reciprocating motion is caused to the pump piston 28 according to a push action of the hydraulic pressure to the actuating piston 29 and a lift action of the eccentric cam 26 to the push rod 27. Further, in a suction stroke whereat the pump piston 28 is moved toward the push rod 27, the suction valve 38 opens, and an oil in the oil tank 19 is sucked into the pump chamber 35 from the conduit 37 by way of the inlet chamber 31; in a discharge stroke whereat the pump piston 28 is moved toward the actuating piston 29, the unidirectional sealing member 39 opens, and an oil in the pump chamber 35 is fed to the outlet chamber 32 and further to the hydraulic control chamber 53 through the oil passage 57. Then, when pressure in the outlet chamber 32 and the hydraulic control chamber 53 rises to a predetermined value, the pump piston 28 is held in contact with the plug 34 by the pressure of the outlet chamber 32.

The hydraulic control chamber 53 of the modulator 17 is at first interrupted from communicating with the oil tank 19 by closing of the exhaust pressure valve 20, therefore the hydraulic pressure fed from the hydraulic pump 16 to the chamber 53 works directly on the pressure reducing piston 46 to hold it at the retracted position, keeping the valve body 60 open by the valve opening rod 62. Thus the output hydraulic pressure of the master cylinder 5 is permitted to pass through the port 59.

Accordingly, brake force applied to the front wheel brakes 3l, 3r is proportional to the output hydraulic pressure of the master cylinder 5 at initial stage of braking.

When angular deceleration is generated by the front wheel 2 owing to the braking operation, the flywheel 72 senses it and tends to overrun the drive shaft 42 by the stored inertial force in the flywheel 7. The relative movement of the flywheel 72 under this condition causes relative rotation between the cam plates 82, 83, to axially displace the flywheel 72 by the thrust generated by the rolling of thrust ball 84, forcing the plate 89 to press and move the lever 91. However, the angular deceleration of the front wheel 2 is low at a stage where there is no possibility of locking of the front wheel 2, which is not powerful enough to rock the lever 91.

However, when the front wheel 2 is about to lock according to an excessive brake force or a lowering in coefficient of friction of the road, the angular deceleration of the front wheel 2 sharply increases accordingly and a pressing force of the push plate 89 exceeds a predetermined value, swinging the lever 91 around the shaft 90 to compress the spring 94, therefore the second arm 91b of the lever 91 is swung to move apart from the valve body 67, and the exhaust pressure valve 20 consequently opens.

When the exhaust pressure valve 20 opens, the hydraulic pressure of the hydraulic control chamber 53 is discharged to the oil tank 19 by way of the oil passage 70, the inlet chamber 68, the valve port 66, the outlet chamber 69, the oil passage 71, the inlet chamber 31 of the hydraulic pump 16 and the conduit 37, therefore the pressure reducing piston 46 is moved toward the hydraulic control chamber 53 by the hydraulic pressure in the output hydraulic chamber 55 against a force of the return spring 48. The valve opening rod 62 is thus retreated to allow the valve body 60 to close the port 59 so that the input and output hydraulic chambers 54, 55 are interrupted from communicating with each other, and the volume of the output hydraulic chamber 55 is increased. A braking hydraulic pressure working on the front wheel brakes 3l, 3r is reduced consequently to decrease the brake force of the front wheel 2, and locking of the front wheel 2 can be avoided. Then, a pressing force of the push plate 89 onto the lever 91 is released in accordance as the front wheel 2 is accelerated, the lever 91 swings and returns to its original position by a reaction force of the spring 4, thus placing the exhaust pressure valve 20 in closed state. When the exhaust pressure valve 20 is closed, pressure oil discharged from the hydraulic pump 16 is immediately confined in the hydraulic control chamber 53 and the pressure reducing piston 46 is retreated toward the output hydraulic chamber 55 to boost the chamber 55, thus recovering the brake power. This operation is repeated at high frequency and the front wheel 2 is braked efficiently.

Figure 7:
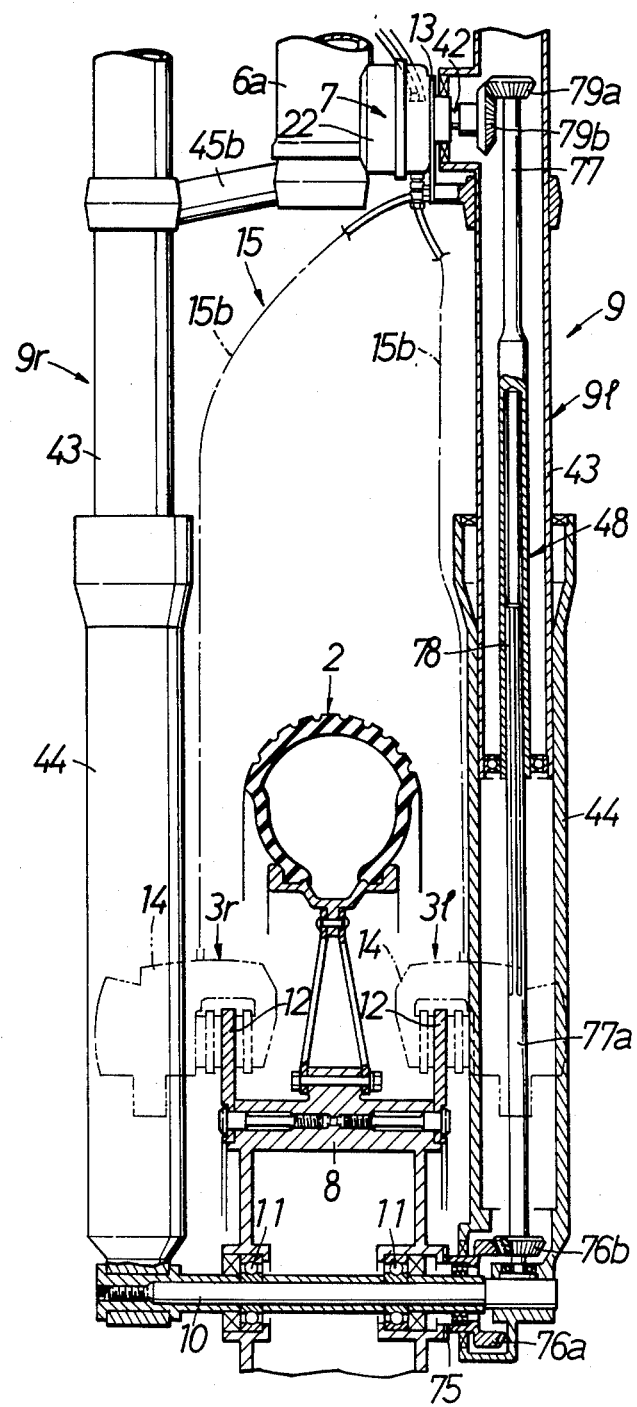
FIG. 7 is a front view in vertical section of the main part of a motorcycle, showing a second embodiment of the invention.

FIG. 7 shows a second embodiment of the invention. This embodiment has a similar structure to the first embodiment except in the features that the suspension spring and the damping mechanism are removed from one fork leg 9l of the front fork 9, and that the transmission device 48 is housed in the fork pipe 43 and the bottom case 44 of the fork leg 9l. In FIG. 7, like referential numerals denote like elements.

According to this embodiment, one fork leg 9l can serve as an expandable housing for the transmission device 48, which leads to simplification of the structure.

It goes without saying that the suspension spring and the damping mechanism in the other fork leg 9r should be designed to have an adequate capacity for bearing the load equivalent for both fork legs 9l and 9r.

Figure 8:
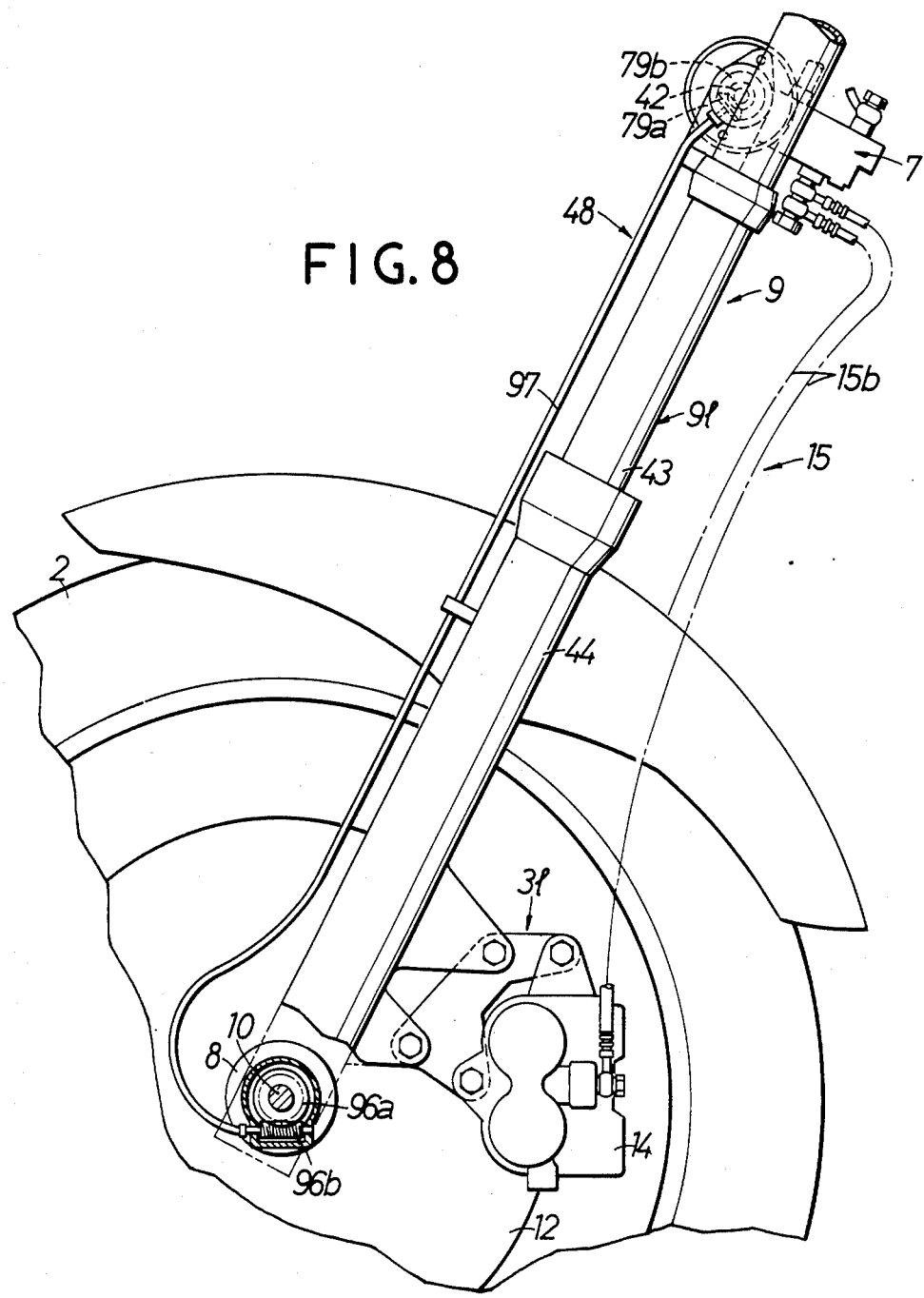
FIG. 8 is a side elevational view of the front portion of a motorcycle, showing a third embodiment of the invention.

FIG. 8 shows a third embodiment of the invention, in which the transmission device 48 is made to be flexible in accordance with the expanding and contracting movement of the front fork 9. One fork leg 9l is provided with a drive helical gear 96a which is connected to the hub 8 of the front wheel 2, a driven helical gear 96b meshing with the helical gear 96a, and a transmission cable 97 for combining the driven helical gear 96b with the upper drive bevel gear 79a. Since the other structure is the same as the first embodiment, like referential numerals denote like elements in FIGS. 1, 2 and 8.

According to this embodiment in which the transmission cable 97 is flexed in accordance with the expanding and contracting movement of the front fork 9, the rotation of the hub 8 is transmitted to the drive shaft 42 without trouble.

What is claimed is:

1. An apparatus for supporting and driving a wheel angular deceleration sensor for a vehicle comprising:
 a suspension device;
 a wheel suspended on a body of the vehicle through said suspension device with a damping facility, wherein said suspension device includes: a vehicle body side member which constitutes together with the vehicle body a stationary supporting structure and a wheel side member movable in a manner following vertical vibration of said wheel during traveling of the vehicle, said wheel side member constituting together with said wheel a followingly movable structure that is movable relative to the stationary supporting structure, and wherein said stationary supporting structure supports an inertia type wheel angular deceleration sensor having a flywheel, said sensor being connected to said wheel by a transmission device connected between a drive shaft leading to said sensor and said wheel, said transmission device including means for absorbing the vertical vibration transferred from said wheel;
 a hydraulic braking device for braking said wheel on the followingly movable structure;

a master cylinder for outputting braking oil pressure; and an antilock control unit adapted for controlling the output oil pressure of said master cylinder in accordance with the decelerating state of said wheel sensed by said sensor and supplying an adjusted oil pressure to said brake device; wherein said master cylinder and said antilock control unit are supported on said stationary supporting structure, wherein an oil reservoir is supported on the stationary supporting structure, and wherein said antilock control unit is connected with said master cylinder, said oil reservoir, and said braking device through respective pipings.

2. An apparatus for supporting and driving a wheel angular deceleration sensor according to claim 1, wherein said transmission device comprises a lower rotary shaft connected to said wheel through a first gear mechanism and an upper rotary shaft connected to said drive shaft through a second gear mechanism, said upper and lower rotary shafts being axially slidably connected to each other through a spline.

3. An apparatus for supporting and driving a wheel angular deceleration sensor according to claim 2, wherein said upper and lower rotary shafts are supported in a transmission housing which is integrally retained by said wheel side member of said suspension device.

4. An apparatus for supporting and driving a wheel angular deceleration sensor according to claim 3, wherein said upper rotary shaft has a portion protruding upwardly from said transmission housing, said portion and said second gear mechanism are enveloped by a cover having at an intermediate portion thereof a flexible bellows.

5. An apparatus for supporting and driving a wheel angular deceleration sensor according to claim 2, wherein said transmission device is accommodated in said suspension device.

6. An apparatus for supporting and driving a wheel angular deceleration sensor according to claim 5, wherein said suspension device consists of a pair of left and right suspension units having a suspension spring and a damping mechanism, and said transmission device is accommodated in one of said suspension units while said suspension spring and said damping mechanism are accommodated in the other suspension unit.

7. An apparatus for supporting and driving a wheel angular deceleration sensor according to claim 1, wherein said transmission device comprises a transmission cable connected to said wheel and said drive shaft through first and second gear mechanisms, respectively.

* * * * *